United States Patent [19]

Fridley et al.

[11] 4,405,673
[45] Sep. 20, 1983

[54] SKID PAD FOR MOVING HEAVY ITEMS

[76] Inventors: Kenneth P. Fridley, 1537 E. Vine, West Covina, Calif. 91791; Robert E. Fridley, 5132 Hedda St., Lakewood, Calif. 90712

[21] Appl. No.: 314,885

[22] Filed: Oct. 26, 1981

[51] Int. Cl.³ .......................... B32B 1/04; B32B 3/10; A47B 91/00
[52] U.S. Cl. ...................................... 428/80; 108/51.3; 248/346; 428/81; 428/131; 428/190; 428/192
[58] Field of Search .................. 428/192, 80, 81, 131, 428/190; 108/51.3, 51.1; 248/346, 359; 2/48; 280/19, 24

[56] References Cited

U.S. PATENT DOCUMENTS 3,355,187 11/1967 Brindle .................................. 280/19
4,231,119 11/1980 Quinn ..................................... 2/48
4,283,068 8/1981 Keyser .................................. 280/19

Primary Examiner—Paul J. Thibodeau
Attorney, Agent, or Firm—Boniard I. Brown

[57] ABSTRACT

A skid pad apparatus which includes a generally planar member having first and second edge portions which converge. The skid pad is flexible and generally planar and a reinforcing strip extends along the first and second side edges with an opening intermediate the reinforcing strip and the generally planar member to define a handle.

6 Claims, 5 Drawing Figures

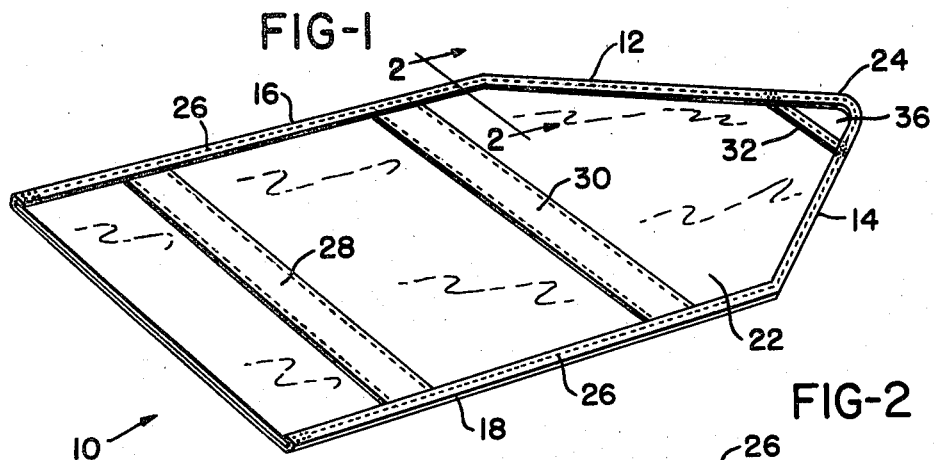
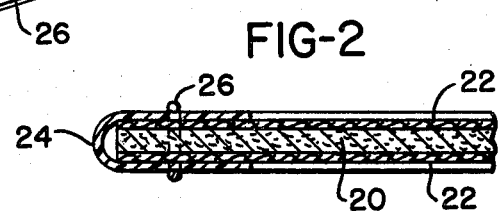
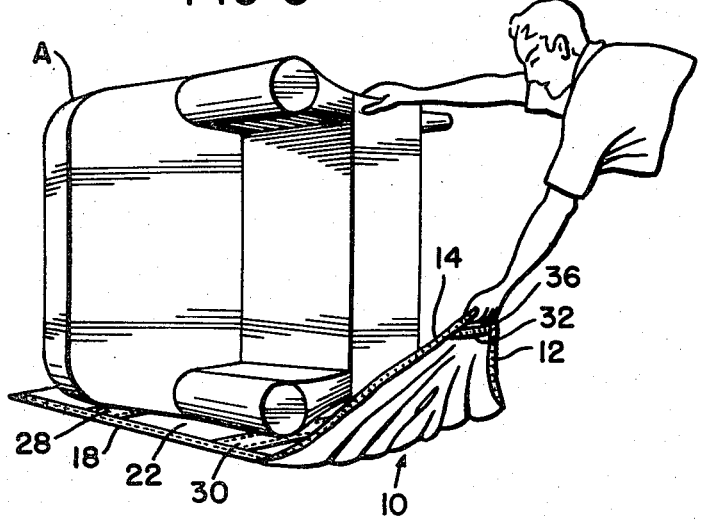
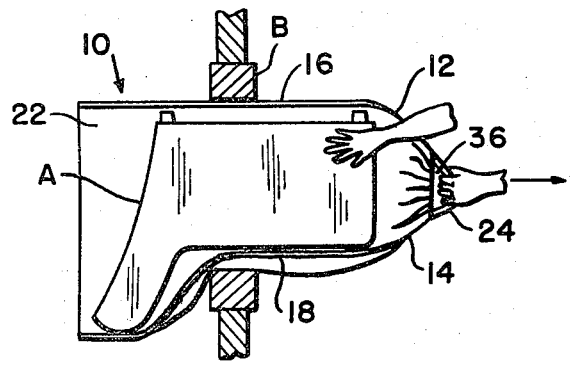
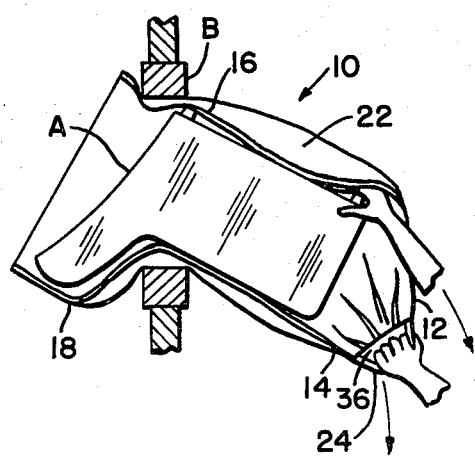

SKID PAD FOR MOVING HEAVY ITEMS

BACKGROUND OF THE INVENTION

The invention relates to materials handling apparatus for moving heavy objects and more particularly to a pad which is particularly suitable for moving furniture.

It has been common practice in the furniture moving field to use quilted pads to protect furniture during transit. Conventional quilted pads, as used in the furniture moving industry, are, of course, quite satisfactory for protecting furniture from damage during transport or storage. However, they are not adequate for actual moving.

These pads have not been found to be wholly satisfactory for moving furniture because the person gripping the quilted pad cannot accurately control the direction of movement of the furniture. In addition, such quilted pads are not sufficiently strong to withstand the substantial stresses imposed. They are also awkward to use, since the user who is attempting to move a heavy item of furniture, must first "bunch" or gather the free portion of the quilted pad so that he may then apply a strong pulling force. Although such quilted pads are widely used for skidding furniture, they are never manufactured so as to sustain the forces which are necessary for the movement of heavy furniture. Accordingly, the pads often develop rips after even one day of usage.

Accordingly it is an object of the invention to provide a skid pad apparatus for heavy furniture which is convenient to use.

Another object of the invention is to provide a skid pad apparatus which is durable and which permits the user to exercise greater control over the direction of movement of the heavy article of furniture which is being moved.

It is an object of the invention to provide apparatus which facilitates the handling of heavy objects by a single person and thus reduces the labor required to move such objects.

Still another object of the invention is to provide apparatus which is simple and inexpensive to manufacture.

SUMMARY OF THE INVENTION

The foregoing objects and other objects and advantages which shall become apparent from the detailed description of the preferred embodiment are attained in a skid pad apparatus which includes a generally planar member having first and second edge portions which converge in the forward direction of the pad. The skid pad is generally planar and generally flexible and a reinforcing strip extends along the first and second side edges with an opening intermediate the reinforcing strip and the generally planar member to define a handle.

The skid pad may further include at least one reinforcing strip extending intermediate the reinforcement strip extending along the first and second sides of the skid pad. The apparatus may further include additional reinforcement bands or strips extending across the generally planar member and fixed thereto as well as to the reinforcement strips which extend along the side edges thereof. The pad generally may have the geometric shape of a combination of a rearward rectangle and a forward truncated isosceles triangle having the base thereof contiguous to one side of the rectangle. The apparatus may include a jute liner covered by generally web shaped nylon sheets.

BRIEF DESCRIPTION OF THE ACCOMPANYING DRAWING

FIG. 1 is a perspective view of a skid pad in accordance with one form of the invention;

FIG. 2 is a sectional view taken along the line 2—2 of FIG. 1;

FIG. 3 is a perspective view illustrating one manner of use of the skid pad illustrated in FIG. 1; and FIGS. 4 and 5 are plan views, in partial section, of the skid pad illustrated in FIG. 1 being used to maneuver a chair through a doorway.

DESCRIPTION OF THE PREFERRED EMBODIMENT

Referring now to FIGS. 1–5, there is shown a skid pad 10 in accordance with one form of the invention. The skid pad 10 is essentially planar and the shape is a combination of a rectangle and an truncated isosceles triangle having the base thereof extending along the smaller of the two sides of the rectangle. This geometric relationship may be visualized from FIG. 1. The side edges of the skid pad 10 corresponding to the sides of the truncated isosceles triangle are identified respectively by the numerals 12, 14. The side edges 12, 14 converge forwardly. The side edge portions of the rectangular portion of the skid pad 10 are identified by the numerals 16, 18.

The skid pad 10 is, in the preferred embodiment, constructed of a jute inner liner 20, as best illustrated in FIG. 2. The inner liner 20 is covered on the top and bottom sides by a nlyon or canvas cover 22. A nylon reinforcement 24 extends along the extent of the edges 16, 12, 14 and 18. Stitching 26 extends through the nylon reinforcement 24, canvas cover 22, and inner liner 20. Extending in generally transverse, parallel relationship are reinforcing strips 28, 30 and 32. Reinforcing strips 28 and 30 are wider than the reinforcing strip 32 and are stitched along each side thereof. The reinforcing strip 32 extends along the truncated portion of the triangular section of the skid pad 10.

It will be understood that a generally triangular opening 36 is formed intermediate the reinforcing strip 24 extending along the sides 12, 14 and the reinforcement strip 32. The reinforcement strip 36 thus constitutes a handle to facilitate the maneuvering of heavy objects such as the chair A. More particularly the user, as shown in FIGS. 3–5, grasps the handle defined by the reinforcing strip 24 and the opening 36 to propel the chair A or other similar object through a doorway or around another obstruction. It has been found that this manner of maneuvering permits much greater control over the movement of an object than is possible with skid apparatus generally utilized. More particularly, the reinforcement strip 24 permits the transfer of forces to the canvas cover 22 and thereby to the chair A or other similar object to readily direct the movement thereof. An additional benefit is that the skid pad 10 distributes the forces over a large portion so that local stresses are avoided.

As best seen in FIGS. 4 and 5, the skid pad 10 may be draped about the sides of the chair A. The handle defined by the opening 36 and the reinforcement strip 24 permits the easy guiding of the chair A through a doorway B. Obviously, as best seen in FIGS. 4 and 5, the ease of maneuverability of the chair A greatly facilitates the rotation of the L-shaped chair, as viewed, through the doorway B. The manner of utilization of the skid pad 10 is best shown in FIGS. 3, 4, and 5.

An additional advantage of the apparatus in accordance with the invention is that it reduces back strain because of the greater ease with which objects may be maneuvered. The geometric relationship between the handle structure and the remainder of the skid pad has been found to be particularly advantageous because of the greater ease with which heavy objects may be directed. The greater control over the movement of the heavy objects has the further advantage that the probability of damage to furniture or dwellings is reduced. This is mutually advantageous for all parties concerned including the homeowner, moving company, and insurance company. The skid pad 10 ordinarily will be constructed to be quite flexible and thus adapted not to scratch or damage the item being moved or the door frame or other structural elements of the dwelling in which the furniture is being moved. The structure described has been found to be sufficiently strong to withstand substantial stress and particularly the stresses involved in moving heavy furniture items. This is unlike conventional quilted pads which have not been found to be sufficiently strong. The apparatus, in accordance with the invention, has also been found to eliminate the necessity for a second person to maneuver heavy objects.

The invention has been described with reference to its illustrated preferred embodiment. Persons skilled in the art of constructing skid pads may, upon exposure to the teachings herein, conceive variations in the mechanical development of the components therein. Such variations are deemed to be encompassed by the disclosure, the invention being delimited only by the appended claims.

The inventor claims:
1. A skid pad apparatus which comprises:
an elongated generally planar flexible member having first and second side edges and a forward edge, the side edges converging forwardly; and
a reinforcing strip extending along said first and second side edges and extending beyond said forward edge to define an opening intermediate said reinforcing strip and said flexible member and to define a handle continuous with the reinforcing strip for maneuvering heavy loads positioned on the skid pad.
2. The apparatus as described in claim 1, wherein:
said generally planar member has a generally triangular forwardly converging portion.
3. The apparatus as described in claim 2, wherein:
said generally planar member has a rearward portion remote from said handle, said reinforcement strip extending along and being affixed to the side edges, and said skid pad further including an additional reinforcing strip affixed to said front edge and extending intermediate said first and second side edges of said generally planar flexible member.
4. The apparatus as described in claim 3, wherein:
said apparatus further includes reinforcement bands extending across said planar member and affixed thereto and to said edge reinforcing strip.
5. The apparatus as described in claim 4, and further including:
a rearward generally rectangular portion contiguous to and extending rearwardly of said forwardly converging portion.
6. The apparatus as described in claim 5, wherein:
said generally planar, flexible member comprises a jute liner covered by nylon sheets.

* * * * *